United States Patent
Ouchida et al.

(10) Patent No.: US 10,223,660 B2
(45) Date of Patent: Mar. 5, 2019

(54) SYSTEM FOR GENERATION OF AN INCOME DISTRIBUTION MAP ASSOCIATED WITH A FISHING SHIP

(71) Applicant: YANMAR CO., LTD., Osaka-shi, Osaka (JP)

(72) Inventors: Takeshi Ouchida, Osaka (JP); Keisuke Uezumiya, Osaka (JP); Yoshiaki Yasui, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 384 days.

(21) Appl. No.: 14/913,506

(22) PCT Filed: Aug. 12, 2014

(86) PCT No.: PCT/JP2014/071314
§ 371 (c)(1),
(2) Date: Feb. 22, 2016

(87) PCT Pub. No.: WO2015/029773
PCT Pub. Date: Mar. 5, 2015

(65) Prior Publication Data
US 2016/0210579 A1    Jul. 21, 2016

(30) Foreign Application Priority Data
Aug. 28, 2013    (JP) ................ 2013-176843

(51) Int. Cl.
*G06Q 10/06* (2012.01)
*G06Q 50/02* (2012.01)
*G06F 17/30* (2006.01)

(52) U.S. Cl.
CPC . *G06Q 10/06393* (2013.01); *G06F 17/30241* (2013.01); *G06Q 10/06* (2013.01); *G06Q 50/02* (2013.01)

(58) Field of Classification Search
CPC ......... G06Q 10/00; G06Q 40/06; G06F 17/60
(Continued)

(56) References Cited

U.S. PATENT DOCUMENTS 7,904,337 B2 *  3/2011  Morsa .................... G06Q 30/02
                                                        705/1.1
8,115,699 B2    2/2012  Miyamoto et al.
(Continued)

FOREIGN PATENT DOCUMENTS

JP    H10197622 A     7/1998
JP    2006320203 A    11/2006
(Continued)

OTHER PUBLICATIONS

Ahmed et al (Growth and distribution of port-based global fishing effort within countries' EEZs from 1970 to 1995).*
(Continued)

*Primary Examiner* — Romain Jeanty
(74) *Attorney, Agent, or Firm* — Norton Rose Fulbright US LLP (57) ABSTRACT

A remote server is capable of acquiring income distribution of a fishing ground. The remote server receives information on positions of a fishing boat, information on operating days of the fishing boat, and income and fuel consumption of the fishing boat on each operating day or at each position of the operating day. The remote server outputs the income and the fuel consumption for each operating day and makes an income distribution map expressing distribution of corbiculae. The remote server outputs the number of times of receipt of the information on the positions on each operating day on the map and makes a collection spot distribution map expressing distribution of the collection spot by the fishing boat.

20 Claims, 7 Drawing Sheets

(58) Field of Classification Search
 USPC .................................................. 705/7.39, 7.29
 See application file for complete search history.

(56) References Cited

U.S. PATENT DOCUMENTS

| | | |
|---|---|---|
| 8,854,279 B2 | 10/2014 | Miyamoto et al. |
| 2007/0080831 A1 | 4/2007 | Miyamoto et al. |
| 2012/0108272 A1 | 5/2012 | Miyamoto et al. |
| 2013/0159330 A1 | 6/2013 | Smith |
| 2014/0375556 A1 | 12/2014 | Miyamoto et al. |

FOREIGN PATENT DOCUMENTS

| | | | |
|---|---|---|---|
| JP | 2007108340 A | | 4/2007 |
| JP | 2008226259 A | * | 9/2008 |

OTHER PUBLICATIONS

McGraph et al "The commercial fisheries of the lower amazon: an economic analysis", Dec. 2001, Fisheries Management and ecology, pp. 253-269. (Year: 2001).*
Extended European Search Report corresponding to Application No. 14839369.7-1958/3040933 PCT/JP2014/071314; dated Dec. 12, 2016.
Asuka Kato et al., "Development of aquatic resources assessment system for sea cucumber usingdigital signage system", IPSJ SIG Technical Report, vol. 2010-EMB-18 No. 5, p. 1-6, Oct. 15, 2010.
International Search Report corresponding to Application No. PCT/JP2014/071314; dated Sep. 9, 2014, with English translation.
Masaaki Wada, "Fisheries in Ubiquitous Network Society", vol. 113 No. 186 IEICE Technical Report, Aug. 22, 2013.

\* cited by examiner

SYSTEM FOR GENERATION OF AN INCOME DISTRIBUTION MAP ASSOCIATED WITH A FISHING SHIP

CROSS REFERENCE TO RELATED APPLICATIONS

This is the U.S. national stage of application No. PCT/JP2014/071314, filed on Aug. 12, 2014. Priority under 35 U.S.C. § 119(a) and 35 U.S.C. § 365(b) is claimed from Japanese Application No. 2013-176843, filed Aug. 28, 2013, the disclosure of which is also incorporated herein by reference.

TECHNICAL FIELD

The present invention relates to a remote server acquiring an income distribution of a fishing ground.

BACKGROUND ART

A remote server provides a distant user with some service. For example, in a field of fishery, a global positioning system (GPS) as one of remote servers acquires present location information on a ship. JP 10-197622 A discloses that the remote server acquires the location information on the ship and makes a track chat by displaying the information on a map.

On the other hand, in a field of longshore fishery for collecting shellfishes and seaweeds, a ship is often anchored at a spot to be operated. In a fishing ground (for example, the sea near the shore, or the lake), if a catch of fish is considered as income, income distribution of the fishing ground is acquired by obtaining the information on the ship operating in the fishing ground including operating days, anchor spots, and the catch of fish.

CITATION LIST

Patent Literature

PTL1: JP 10-197622 A

SUMMARY OF INVENTION

Technical Problem

The object of the present invention is to provide a remote server acquiring income distribution of a fishing ground.

Solution to Problem

The present invention is a remote server receiving information on positions of ships, information on operating days and a catch of fish on each operating day. The remote server outputs a collection distribution map by plotting the information on the positions classified depending on anchor time and outputs an income distribution map by plotting the catch of fish of each position classified depending on the anchor time.

Advantageous Effects of Invention

In accordance with a remote server according to the present invention, income and an operating time at each spot on each operating day can be acquired, thus enabling to acquire income distribution of a fishing ground.

DESCRIPTION OF EMBODIMENTS

Figure 1:
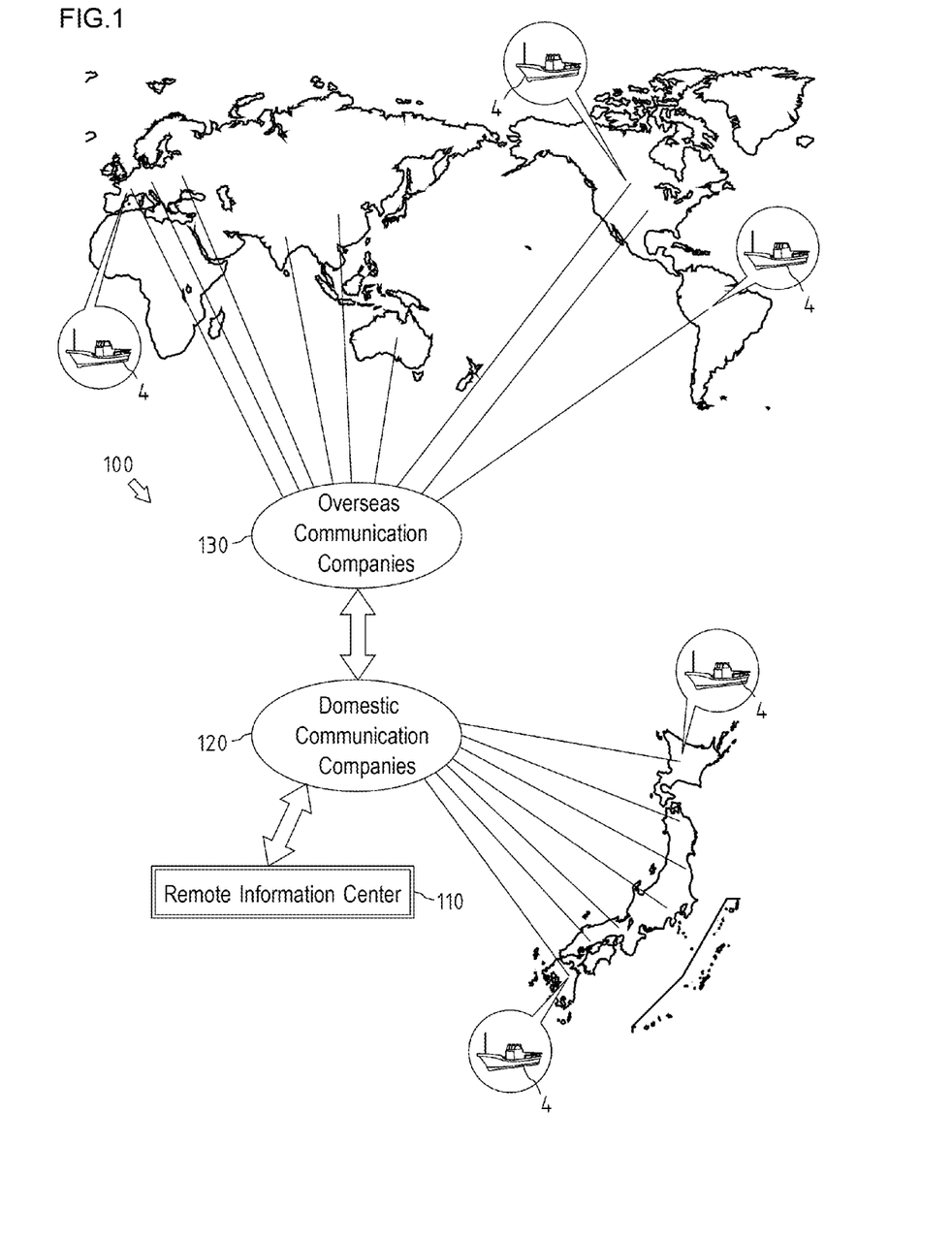
FIG. 1 is a view showing a configuration of a remote server.

A remote server system 100 is explained using FIG. 1.

FIG. 1 schematically shows the remote server system 100.

The remote server system 100 is a system according to an embodiment according to the present invention. The remote server system 100 provides a distance user with some service. The remote server system 100 in the present embodiment provides some service to a user using a fishing boat 4 operating in a lake A (see FIG. 3) from a remote information center 110 through overseas communication companies 130 in countries of the world and domestic communication companies 120.

Figure 2:
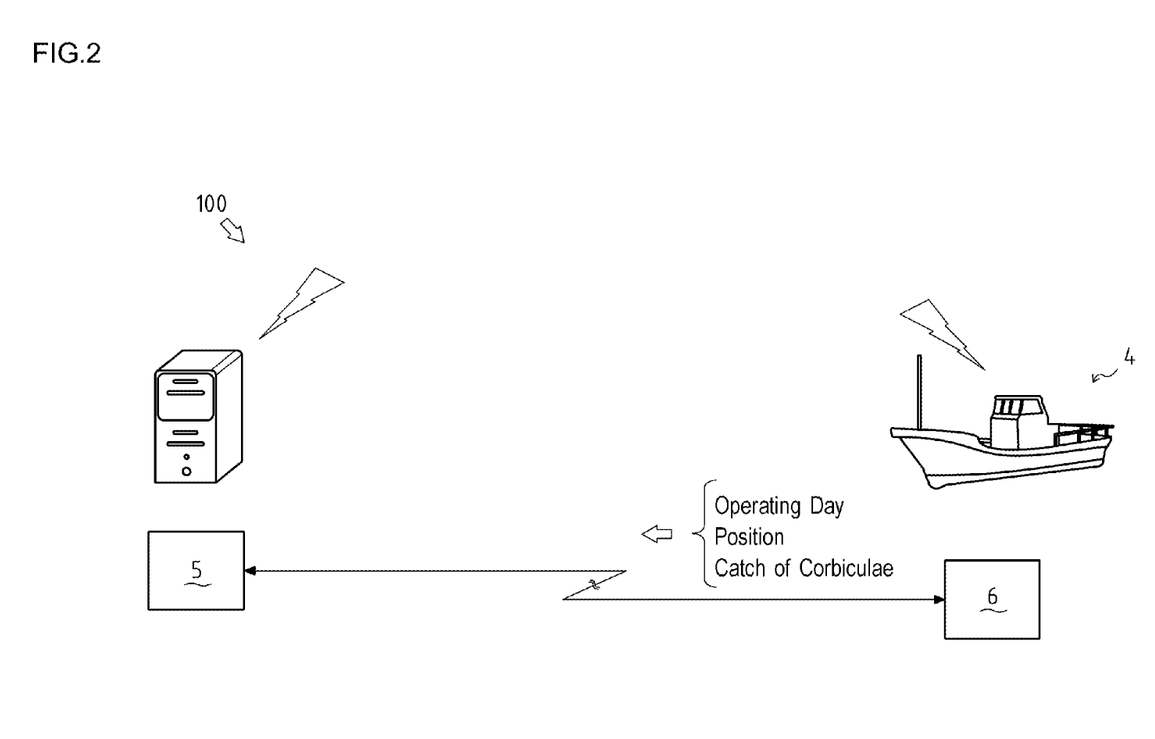
FIG. 2 is another view showing the configuration of the remote server.

The remote server system 100 is further explained using FIG. 2.

FIG. 2 schematically shows the remote server system 100.

The remote server system 100 in the present embodiment provides the user using the fishing boat 4 operating in the lake A with a collection spot distribution map 55 and an income distribution map 56 described below. In the present embodiment, the fishing boat 4 operates to collect corbiculae.

The remote server system 100 is configured such that a remote server 5 disposed in the remote information center 110 (see FIG. 1) can communicates with a terminal server 6 disposed in the operating fishing boat 4.

The remote server 5 is configured to communicate with many terminal servers 6 at the same time. For example, the remote server 5 is configured to communicate with a terminal server 6 disposed in a fishing boat operating in the lake A and a terminal server 6 disposed in a fishing boat operating in another fishing ground (a river, a lake or the like).

In the present embodiment, the terminal servers 6 of the fishing boat 4 operating in the lake A sends at least operating days, positions and a catch (weight) of the corbiculae of the fishing boat 4 to the remote server 5.

The remote server 5 makes the collection spot distribution map 55 and the income distribution map 56 described below based on information of the lake A, sent by the terminal servers 6, on the operating days, the positions and the catch of the corbiculae of the fishing boat 4.

Figure 3:
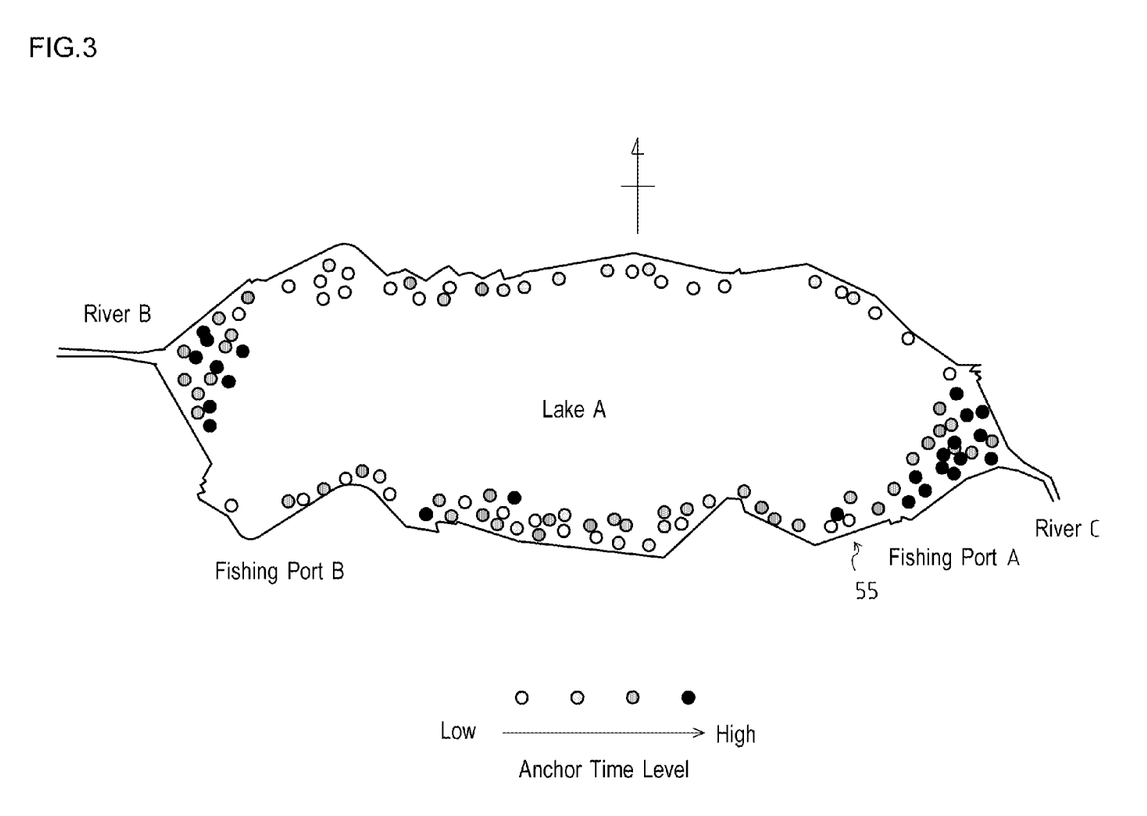
FIG. 3 shows a collection spot distribution map.

The collection spot distribution map 55 is explained using FIG. 3.

FIG. 3 schematically shows the collection spot distribution map 55.

The collection spot distribution map 55 expresses, for example, distribution of the collection spot by the fishing boat 4 in the lake A in a fishing season of the corbiculae. In the present invention, the collection spot is a spot where the fishing boat 4 is at anchor for a long time in order to collect the corbiculae.

The collection spot distribution map 55 expresses distribution of the collection spot in the lake A in a planar view. The collection spot distribution map 55 according to the present embodiment classifies spots in the lake A depending on an anchor time level. The anchor time level is divided into four levels indicated by circles having shading depending on the time at each spot in the lake A when the fishing boat is at anchor.

For example, many dark circles are illustrated in a spot where a river B or a river C joins the lake A. This shows that the fishing boat 4 is at anchor for a long time in the spot. On the other hand, light dark circles are illustrated in a spot of the north coast of the lake A. This shows that the fishing boat 4 is at anchor for a short time in the spot.

Figure 4:
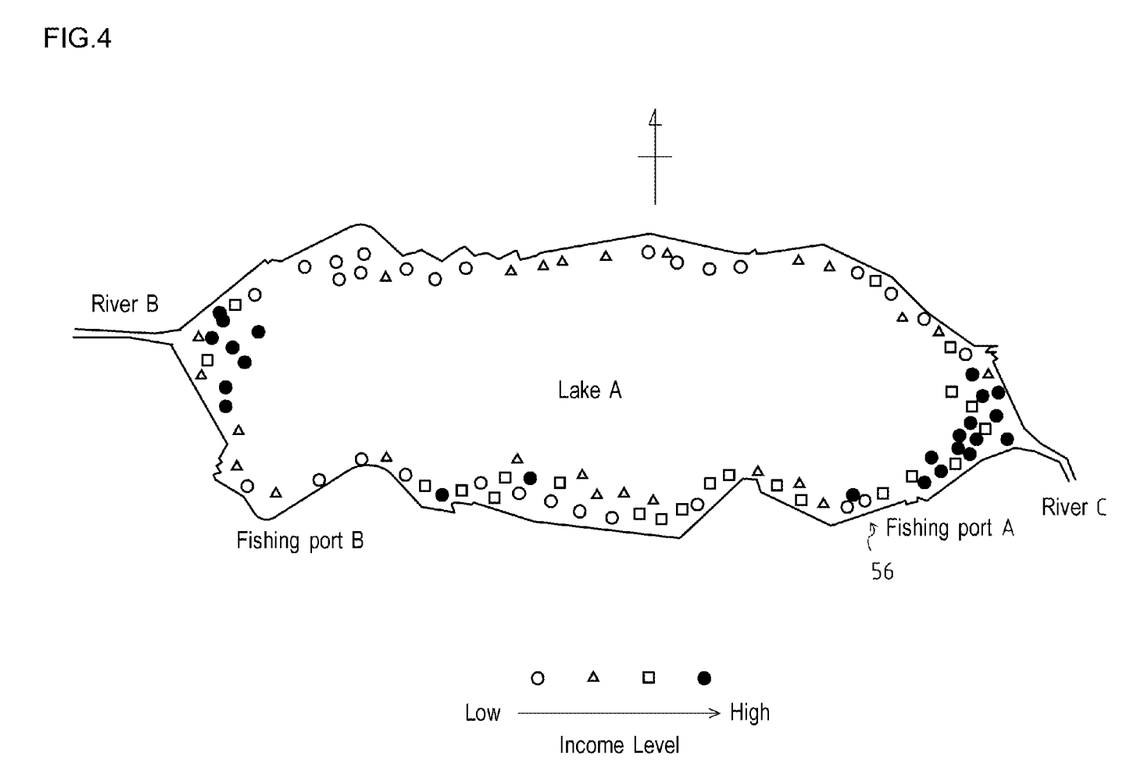
FIG. 4 shows an income distribution map.

The income distribution map 56 is explained using FIG. 4.

FIG. 4 schematically shows the income distribution map 56.

The income distribution map 56 expresses, for example, distribution of income of the lake A in the fishing season of the corbiculae. In the present embodiment, the income is the catch (weight) of the corbiculae which the fishing boat 4 collects.

The income distribution map 56 expresses distribution of the income in the lake A in a planar view. The income distribution map 56 according to the present embodiment classifies spots in the lake A depending on to an income level. The income level is divided into four levels indicated by an open circle, a triangle, a square and a filled circle in descending order of the income at each spot in the lake A.

For example, many squares and filled circles are illustrated in a spot where the river B or the river C joins the lake A. This shows that the fishing boat 4 collects a large catch of the corbiculae at the spot, namely that the fishing boat 4 is at anchor for a long time at the spot.

On the other hand, many open circles and triangles illustrated in a spot of the north coast of the lake A. This shows that the fishing boat 4 collects a small catch of corbiculae in the spot, namely that the fishing boat 4 is at anchor for a short time at the spot.

Figure 5:
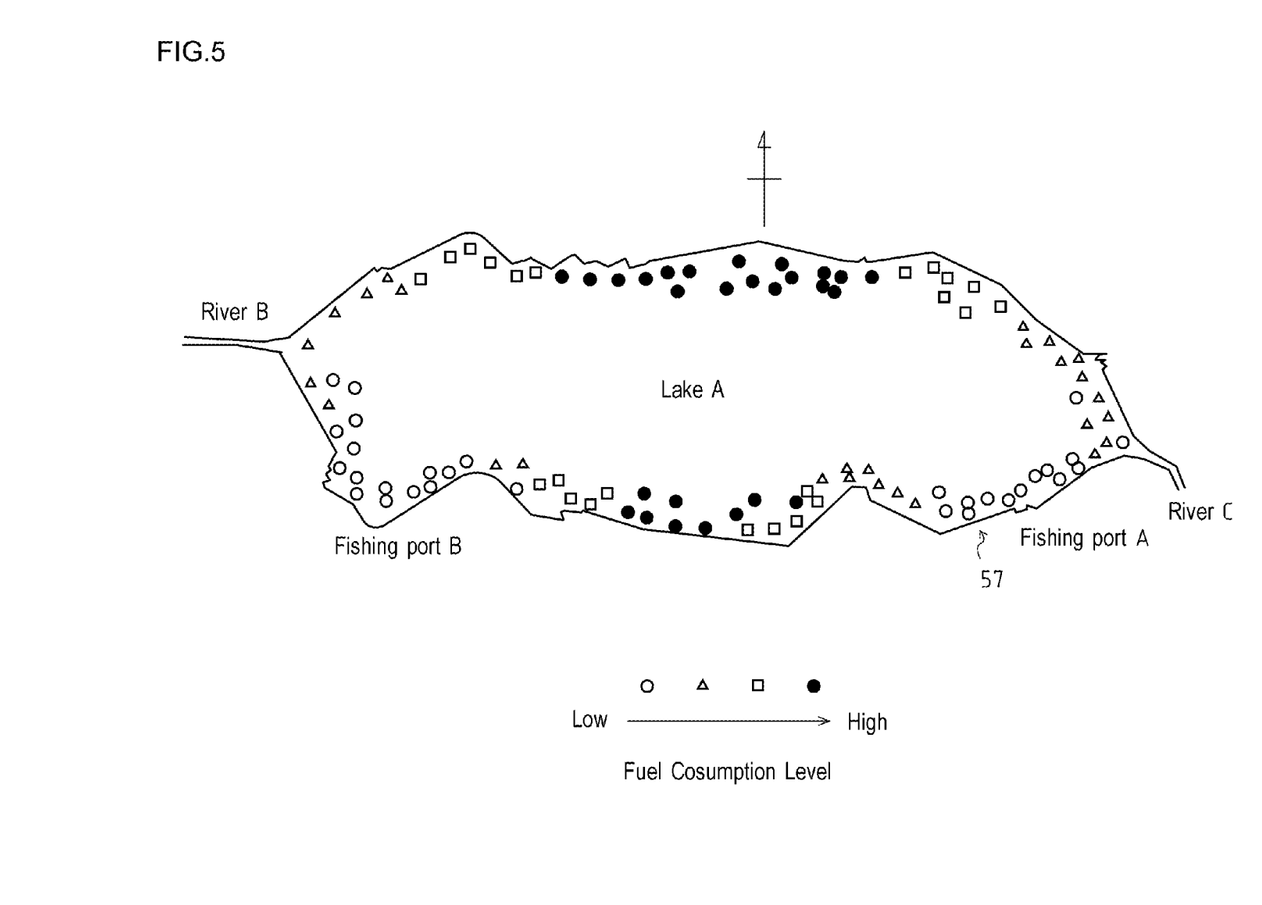
FIG. 5 shows a fuel consumption map.

A fuel consumption map 57 is explained using FIG. 5.

FIG. 5 schematically shows the fuel consumption map 57.

The fuel consumption map 57 expresses, for example, distribution of fuel consumption of the operating fishing boat 4.

The fuel consumption map 57 expresses the distribution of fuel consumption of the operating fishing boat 4 in a planar view. The fuel consumption map 57 according to the present embodiment classifies anchor spots (collection spots) in the lake A depending on a fuel consumption level. The fuel consumption level is divided into four levels indicated by an open circle, a triangle, a square and a filled circle in descending order of the fuel consumption of the fishing boat 4 operating in the lake A.

For example, many open circles and triangles are illustrated in a spot near a fishing port A in the lake A. This shows that the fishing boat 4 operates with small fuel consumption in the spot. On the other hand, many squares and filled circles illustrated in a spot far the fishing port A. This shows the fishing boat 4 operates with large fuel consumption in the spot.

Figure 6:
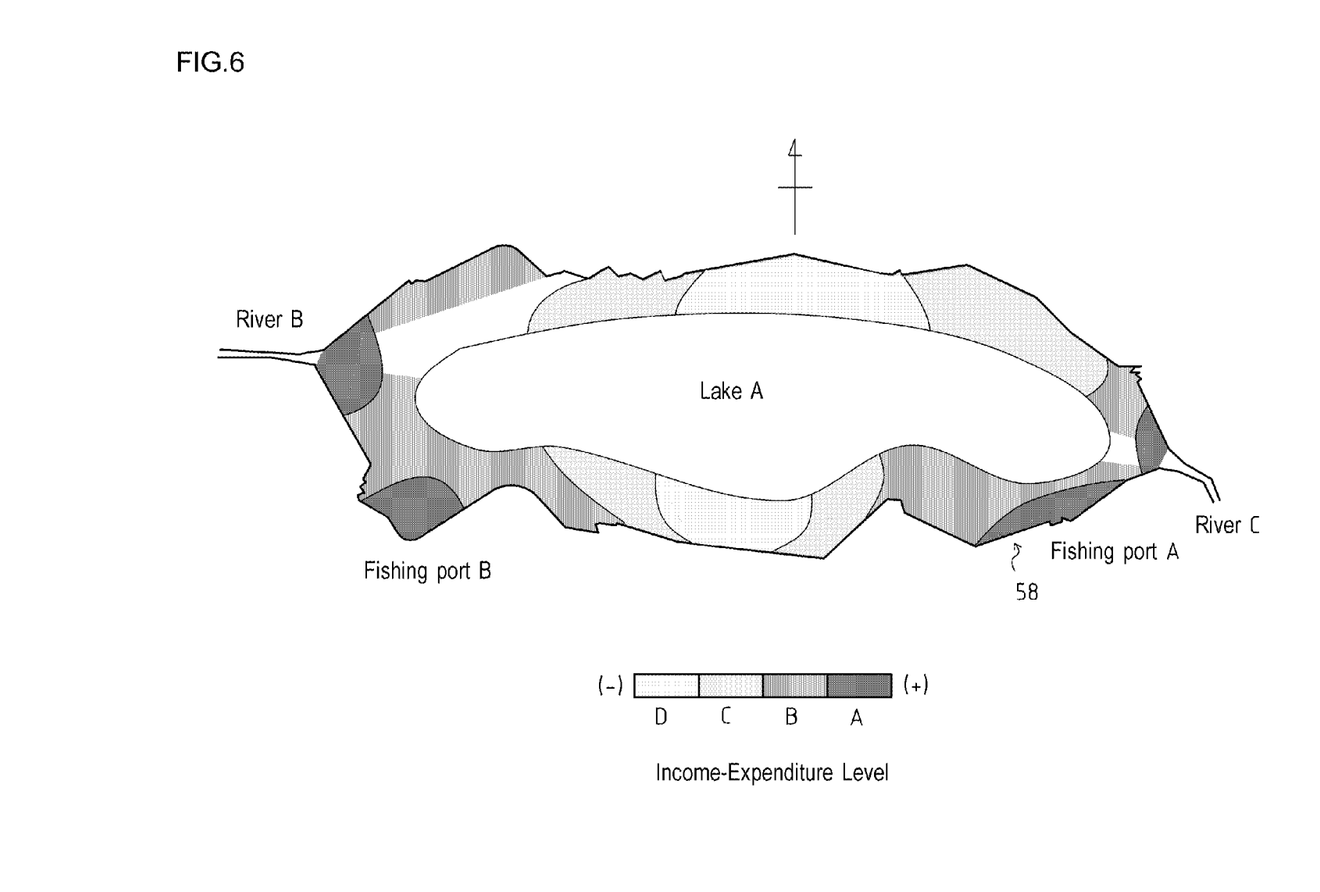
FIG. 6 shows an income-expenditure distribution map.

An income-expenditure distribution map 58 is explained using FIG. 6.

FIG. 6 schematically shows the income-expenditure distribution map 58.

The income-expenditure distribution map 58 expresses, for example, distribution of income and expenditure of the lake A. The income and expenditure indicates the sum of income and expenditure in the fishery production. In the present embodiment, the income is the catch of corbiculae by the fishing boat 4. The expenditure is the fuel consumption of the fishing boat 4.

In the income-expenditure distribution map 58, the catch and the fuel consumption are converted into the market price in order to sum up the income and the expenditure.

The income-expenditure distribution map 58 expresses the distribution of the income and the expenditure of the lake A in a planar view. The income-expenditure distribution map 58 according to the present embodiment classifies spots in the lake A depending on income-expenditure level. The income-expenditure level is divided into four levels indicated by A, B, C and D in descending order of a ratio of the income to the expenditure. In the income-expenditure distribution map 58, the income-expenditure level of each spot is expressed by shading.

Figure 7:
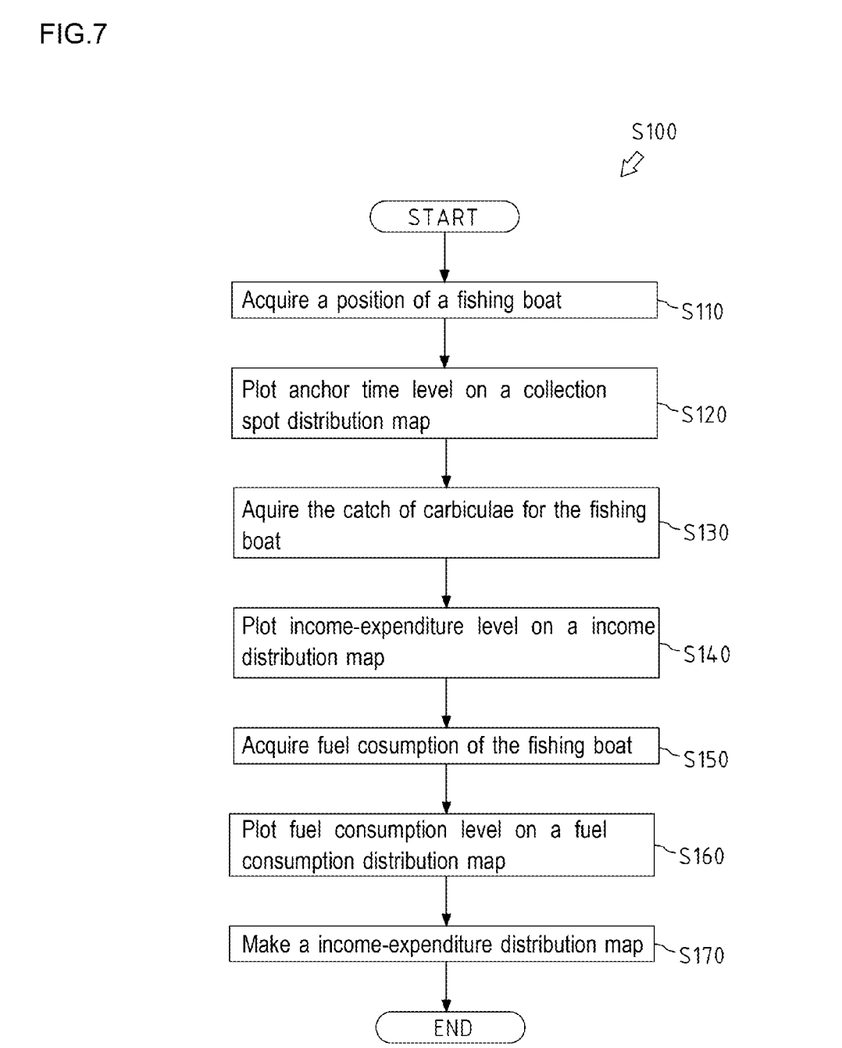
FIG. 7 shows a flow of income-expenditure distribution acquisition control.

A flow of income distribution acquisition control S100 is explained using FIG. 7.

FIG. 7 shows the flow of the income distribution acquisition control S100 using a flowchart.

In the income distribution acquisition control S100, the above-mentioned collection spot distribution map 55 and income distribution map 56 are acquired based on operation result of the fishing boat 4 in the lake A in the fishing season.

In a step S110 and a step S120, the above-mentioned collection spot distribution map 55 is acquired.

In the step S110, the remote server 5 acquires the operating day and position of the fishing boat 4. Specifically, the remote server 5 acquires an average position of the fishing ship 4 in a predetermined period of the operating day. The remote server 5 considers a spot having most average positions in acquired average positions of the fishing ship 4 as a collection spot in the operation.

In the step S120, the remote server 5 converts anchor time at the collection spot acquired in the step S110 into the anchor time level and then plots the anchor time level on the collection spot distribution map 55.

In a step S130 and a step S140, the income distribution map 56 is acquired.

In the step S130, the remote server 5 acquires the catch of corbiculae in the operating day. Specifically, the remote server 5 acquires the catch (weight) of corbiculae input by an operator after the operation.

In the present embodiment, the weight is not limited as a unit of the catch of corbiculae inputted by the operator after the operation. For example, the catch of corbiculae may be converted into the market price.

In the step S140, the remote server 5 converts the catch of corbiculae acquired in the S130 into the income level and then plots the income-expenditure level at the collection spot acquired in the S110 of the income distribution map 56.

In a step S150 and a step S160, the fuel consumption map 57 is acquired.

In the step S150, the remote server 5 acquires the operating day, the position and the fuel consumption of the fishing boat 4. Specifically, the remote server 5 acquires the fuel consumption at the anchor spot of the operating day.

In the step S160, the remote server 5 converts the fuel consumption acquired in the S150 into the fuel consumption level at the anchor spot and then plots the fuel consumption level on the fuel consumption map 57.

The remote server 5 repeats the steps S110 to S160 with respect to each operating day and each fishing season.

In step S170, the remote server 5 makes the above-mentioned income-expenditure distribution map 58 based on the collection spot distribution map 55, the income distribution map 56 and the fuel consumption map 57.

In this way, the remote server 5 can make the collection spot distribution map 55 and the income distribution map 56 of the lake A. The collection spot distribution map 55 and the income distribution map 56 is provided for users and is used for, for example, a fishery plan of the lake A of next year and beyond.

Effects of the remote server system 100 and the income distribution acquisition control S100 are explained.

The remote server system 100 and the income distribution acquisition control S100 make it possible to acquire income and operating time at each spot on each operating day, thus enabling to acquire the income distribution of the lake A.

The present invention is not limited to acquire the income distribution of the lake A of the present embodiment. For example, instantaneous fuel consumption of the fishing boat 4 may be acquired and an income-expenditure distribution map may be made such that the income is the catch of corbiculae and the expense is the instantaneous fuel consumption. An income rate map may be made, expressing the income for investment such that the income is the catch of corbiculae and the expense is the instantaneous fuel consumption.

The present invention is not limited to acquire the collection spot distribution and the income distribution of the lake A focusing on one fishing boat 4 of the present embodiment. For example, the collection spot distribution and the income distribution of the lake A are acquired focusing on a plurality of fishing boat 4 belonging to a fisheries union or the like.

INDUSTRIAL APPLICABILITY

The present invention is applicable to a remote server.

REFERENCE SIGNS LIST

4: fishing boat
5: remote server
6: terminal server
56: income distribution map
100: remote server system

The invention claimed is:
1. A system for generation of an income distribution map, the system comprising:
a remote server configured to:
receive, from a ship, information indicating positions of the ship on a lake, operating days, and a catch of fish on each operating day;
for the ship on a particular operating day:
determine an average position of the ship during a particular time period of the particular operating day;
determine a spot having most average positions in acquired average positions of the ship as a collection spot;
convert an anchor time at the collection spot into an anchor time level;
plot the anchor time level to generate a collection distribution map;
acquire a particular catch of the catch of fish for the particular operating day;
convert the particular catch into an income level;
plot the income level at the collection spot to generate an income distribution map; and
generate an income-expenditure distribution map based on the collection distribution map, the income distribution map, and a fuel consumption map, the fuel consumption map based on fuel consumption of the ship at the collection spot of the operating day; and
output the collection distribution map and the income distribution map to the ship for display at the ship.

2. The system of claim 1, further comprising:
the ship, the ship including a first terminal server configured to communicate with the remote server; and
another ship including a second terminal server configured to communicate with the remote server,
wherein the remote server is configured to concurrently communicate with the first terminal server and the second terminal server.

3. The system of claim 1, wherein the remote server is further configured to:
provide, to a terminal server of the ship, the collection distribution map; and
provide, to the terminal server of the ship, the income distribution map.

4. The system of claim 1, wherein the remote server is further configured to:
acquire the fuel consumption of the ship at the collection spot of the operating day;
convert the fuel consumption at the collection spot into a fuel consumption level; and
plot the fuel consumption level to generate the fuel consumption map.

5. The system of claim 4, wherein:
the anchor time level comprises one of four anchor time levels;
the income level comprises one of four income levels; and
the fuel consumption level comprises one of four fuel consumption levels.

6. The system of claim 4, wherein the remote server is further configured to, for the ship on another particular operating day, determine another collection spot.

7. The system of claim 4, wherein the remote server is further configured to determine a sum of an income amount and an expenditure amount, where the income amount corresponds to the catch of fish and the expenditure amount corresponds to the fuel consumption.

8. The system of claim 1, wherein the remote server is further configured to output the fuel consumption map.

9. The system of claim 1, wherein the income-expenditure distribution map indicates an income distribution of the lake in a fishing season.

10. The system of claim 1, further comprising converting the particular catch to a market price.

11. A system for generation of an income distribution map, the system comprising:
a remote server configured to:
receive, from each ship of a plurality of ships, information indicating positions of the ship on a lake, operating days, and a catch of fish on each operating day;
for a first ship of the plurality of ships on a particular operating day:
determine an average position of the first ship during a particular time period of the particular operating day;
determine a spot having most average positions in acquired average positions of the first ship as a collection spot;

convert an anchor time at the collection spot into an anchor time level;
plot the anchor time level to generate a first collection distribution map;
acquire a particular catch of the catch of fish for the particular operating day;
convert the particular catch into an income level;
plot the income level at the collection spot to generate a first income distribution map; and
generate an income-expenditure distribution map based on the first collection distribution map, the first income distribution map, and a fuel consumption map, the fuel consumption map based on fuel consumption of the ship at the collection spot of the operating day; and
output the first collection distribution map and the first income distribution map to at least one ship of the plurality of ships for display at the at least one ship.

12. The system of claim 11, further comprising:
the first ship of the plurality of ships, the first ship including a first terminal server configured to communicate with the remote server.

13. The system of claim 12, further comprising:
a second ship of the plurality of ships, the second ship including a second terminal server configured to communicate with the remote server.

14. The system of claim 13, wherein:
the remote server is configured to concurrently communicate with the first terminal server and the second terminal server.

15. The system of claim 11, further comprising:
for a second ship of the plurality of ships on a particular operating day:
determine an average position of the second ship during a particular time period of the particular operating day;
determine a spot having most average positions in acquired average positions of the second ship as a collection spot;
convert an anchor time at the collection spot into an anchor time level;
plot the anchor time level to generate a second collection distribution map;
acquire a particular catch of the catch of fish for the particular operating day;
convert the particular catch into an income level; and
plot the income level at the collection spot to generate a second income distribution map; and
output the second collection distribution map and the second income distribution map to the at least one ship for display at the at least one ship.

16. The system of claim 11, wherein the remote server is further configured to:
acquire the fuel consumption of the ship at the collection spot of the operating day;
convert the fuel consumption at the collection spot into a fuel consumption level; and
plot the fuel consumption level to generate the fuel consumption map.

17. The system of claim 16, wherein:
the anchor time level comprises one of four anchor time levels;
the income level comprises one of four income levels; and
the fuel consumption level comprises one of four fuel consumption levels.

18. The system of claim 11, wherein the remote server is further configured to output the fuel consumption map.

19. The system of claim 11, wherein the income-expenditure distribution map indicates an income distribution of the lake in a fishing season.

20. The system of claim 11, wherein the at least one ship comprises the first ship.

* * * * *